(12) United States Patent
Zanziger

(10) Patent No.: US 11,014,423 B2
(45) Date of Patent: May 25, 2021

(54) VALVE BLOCK FOR AN ACTIVE SUSPENSION DAMPING SYSTEM, AND METHOD FOR MOUNTING A SHOCK ABSORBER FOR AN ACTIVE SUSPENSION DAMPING SYSTEM

(71) Applicant: Dr. Ing. h.c. F. Porsche Aktiengesellschaft, Stuttgart (DE)

(72) Inventor: Conrad Zanziger, Sachsenheim (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 0 days.

(21) Appl. No.: 16/426,578

(22) Filed: May 30, 2019

(65) Prior Publication Data

US 2019/0389271 A1 Dec. 26, 2019

(30) Foreign Application Priority Data

Jun. 25, 2018 (DE) .......................... 102018115177.2

(51) Int. Cl.
*B60G 17/08* (2006.01)
*F16K 27/02* (2006.01)

(52) U.S. Cl.
CPC .............. *B60G 17/08* (2013.01); *F16K 27/02* (2013.01); *B60G 2202/24* (2013.01);
(Continued)

(58) Field of Classification Search
USPC ...... 251/61.3, 61.5, 61.6; 137/899, 485, 906
See application file for complete search history.

(56) References Cited

U.S. PATENT DOCUMENTS 2,592,656 A * 4/1952 Catranis .................... F16F 9/46
  623/39
5,725,239 A   3/1998 de Molina
(Continued)

FOREIGN PATENT DOCUMENTS

CN    201027883 Y    2/2008
CN    102630285 A    8/2012
(Continued)

OTHER PUBLICATIONS

Chinese Office Action for Chinese Application No. 201910553618.3, dated Nov. 2, 2020, with translation, 12 pages.

*Primary Examiner* — Daphne M Barry
(74) *Attorney, Agent, or Firm* — RatnerPrestia

(57) ABSTRACT

A valve block for an active suspension damping system of a vehicle includes a valve housing delimiting an interior space for connecting to a shock absorber of a wheel suspension system, and a valve piston movably guided in the interior space. The valve piston divides the interior space into a connecting space and a control space. A connecting duct communicates with the connecting space for hydraulically connecting to a damper volume of the shock absorber. At least one connector duct communicates with the connecting space for connection of a hydraulic line. A control duct communicates with the control space for applying a control pressure in the control space. The valve piston has a plug for closing the connecting duct in a closed position of the valve piston in the interior space and for opening the connecting duct in an open position of the valve piston in the interior space.

18 Claims, 2 Drawing Sheets

(52) U.S. Cl.
CPC ...... *B60G 2204/12* (2013.01); *B60G 2206/41* (2013.01); *B60G 2500/112* (2013.01); *B60G 2800/162* (2013.01)

(56) References Cited

U.S. PATENT DOCUMENTS

| | | | |
|---|---|---|---|
| 7,950,414 B2 * | 5/2011 | Suzuki | F02M 63/0054 |
| | | | 137/509 |
| 8,235,186 B2 | 8/2012 | Holt et al. | |
| 10,598,247 B2 | 3/2020 | Schmidt et al. | |

FOREIGN PATENT DOCUMENTS

| | | |
|---|---|---|
| CN | 106151350 A | 11/2016 |
| CN | 205715423 U | 11/2016 |
| CN | 106662193 A | 5/2017 |
| DE | 19712929 A1 | 10/1997 |
| EP | 3009707 A1 | 4/2016 |

\* cited by examiner

VALVE BLOCK FOR AN ACTIVE SUSPENSION DAMPING SYSTEM, AND METHOD FOR MOUNTING A SHOCK ABSORBER FOR AN ACTIVE SUSPENSION DAMPING SYSTEM

CROSS-REFERENCE TO RELATED APPLICATION

This application claims priority to German Patent application No. DE 10 2018 115 177.2, filed Jun. 25, 2018, which is incorporated by reference herein in its entirety.

FIELD OF THE INVENTION

The invention relates to a valve block for an active suspension damping system of a motor vehicle, and to a method for mounting a shock absorber for an active suspension damping system, with the respective aid of which hydraulic lines for the hydraulic variation of the damping behavior of a shock absorber of a wheel suspension system can be connected.

BACKGROUND OF THE INVENTION

DE 197 12 929 A1, which is incorporated by reference herein, has disclosed a shock absorber for a chassis of a motor vehicle, in which shock absorber a hydraulic fluid is shut. The hydraulic fluid communicates with a transfer chamber, of which one side is delimited by way of an elastic disk. A variable pneumatic pressure can be applied on that side of the elastic disk which points away from the hydraulic fluid, in order to vary the flow resistance of the hydraulic fluid through the transfer chamber and to set the damping action of the shock absorber to be softer or harder as a result.

In order for it to be possible for the damping behavior of a shock absorber of a wheel suspension system for a motor vehicle to be changed hydraulically, it is desirable not to enclose a hydraulic fluid of the shock absorber, but rather to feed and/or discharge the hydraulic fluid to/from the shock absorber with the aid of a pump as required, in order to set a desired pressure in the shock absorber. Since the function of the shock absorber is already to be tested prior to the installation into the motor vehicle, it is necessary to this end to already fill the shock absorber with the hydraulic fluid for the function test and to connect the hydraulic lines for connection of the pump only later, for example during final mounting in the motor vehicle. To this end, it is necessary to shut the hydraulic fluid which is already filled in the shock absorber until the connection of the hydraulic lines during the mounting in the shock absorber and/or temporarily for repair and maintenance measures.

SUMMARY OF THE INVENTION

It would be desirable to indicate measures which, with only a low risk of faulty operation, make inexpensive and robust temporary shutting of a hydraulic fluid in a shock absorber of an active suspension damping system of a motor vehicle possible.

Preferred refinements of the invention are specified in the subclaims and the following description which can present an aspect of the invention in each case individually or in combination.

One aspect of the invention relates to a valve block for an active suspension damping system of a motor vehicle having a valve housing which delimits an interior space for connecting to a shock absorber of a wheel suspension system, a valve piston which is guided movably in the interior space, the valve piston dividing the interior space into a connecting space and a control space, a connecting duct which communicates with the connecting space for hydraulically connecting to a damper volume of the shock absorber, at least one connector channel which communicates with the connecting space for connection of a hydraulic line, and a control duct which communicates with the control space for applying a control pressure in the control space, the valve piston having a plug for closing the connecting duct in a closed position of the valve piston in the interior space and for opening the connecting duct in an open position of the valve piston in the interior space.

The valve block can be fastened to the shock absorber, for example by way of screwing, and can configure a common structural unit as a shock absorber unit. For a function test of the shock absorber, the valve piston can be situated in the open position, with the result that a hydraulic fluid can be fed in via the connector duct, which hydraulic fluid can fill a damper volume of the shock absorber. After the function test, a control pressure can be applied at the control duct, in particular pneumatically or hydraulically, in order to close the connecting duct by way of the plug which projects axially from the remaining valve piston, and in the process to shut the remaining hydraulic fluid in the damper volume of the shock absorber. To this end, the control pressure in the control space can be, for example, approximately 8 bar±5 bar. The control pressure is selected to be high enough that the connecting duct remains closed and, in particular, the valve piston remains in the closed position at pressures in the damper volume of the shock absorber which occur during transport of the shock absorber. A closed hydraulic circuit can be configured when the shock absorber is installed and a hydraulic line is connected to the connector duct, via which hydraulic line hydraulic fluid can be fed in and/or discharged with the aid of a pump. The valve piston can then be moved into its open position, by the pressure in the control space being reduced and/or the pressure in the connecting space being increased, with the result that communication can be carried out with the damper volume of the shock absorber via the connector duct and the connecting space which is connected in between.

Since the valve piston can be moved between the closed and the open position by way of the pressure in the control space, a mechanical actuation which as a rule requires parts which can be moved relative to one another is avoided. The actuation of the valve piston is therefore insensitive to external contamination, environmental influences and corrosion effects, for example by way of water and/or salt, with the result that there is a high service life and a high robustness. In addition, a connector valve which is connected to the control duct can be reached rapidly and easily with a low installation space requirement, for example with the aid of a quick action coupling. As a result, it is not necessary to provide free installation space for a pivoting range of a spanner or another tool, in order to move the valve piston from the outside. In order to move the valve piston into the open position, it can already be sufficient to discharge compressed air which is enclosed in the control space via the connector valve, with the result that the functionality of the shock absorber can be re-established rapidly and simply after mounting and/or a repair or maintenance measure. In particular, the risk of faulty operation is ruled out or at least reduced. Since the connecting duct can be closed merely by way of the application of a sufficiently high control pressure in the control space, accidental closure, for example by way of nudging during other activities on the motor vehicle, is avoided. In addition, the valve block has a low number of components, as a result of which the manufacturing costs and the assembly complexity are reduced. This additionally results in a particularly low number of sealing points to be sealed, as a result of which the manufacturing costs can additionally be kept low. The connecting duct can be closed and opened easily by way of the plug as a result of the valve piston which can be moved in a pressure-induced manner via the control duct, with the result that inexpensive and robust temporary shutting of a hydraulic fluid in a shock absorber of an active suspension damping system of a motor vehicle is made possible with a merely low risk of faulty operation.

The valve block can have, in particular, two connector ducts, to which in each case one hydraulic line for the inflow and for the outflow can be connected. The two connector ducts can in principle communicate with a common connecting space, with the result that precisely one valve piston can be provided for the two hydraulic lines. The valve block preferably has a separate interior space which is delimited by the valve housing for each hydraulic line which can be connected, in which interior space in each case one valve piston is provided, with the result that the inflow and the outflow are disconnected from one another and short-circuit flows between the two connected hydraulic lines are avoided. In this case, the control ducts which are connected to the different control spaces can be combined to form a common duct, with the result that a single pressure source for generating the control pressure, in order to press the respective valve piston into the closed position, can be connected via precisely one connector valve.

In particular, the plug is plugged at least partially into the connecting duct in the closed position of the valve piston. As a result, the plug can act on an inner face of the connecting duct in a sealing manner with a component in the radial direction, in particular indirectly via a sealing element. Purely axial bearing against an opening of the connecting duct, which opening is provided in a wall face of the valve housing which delimits the connecting space, is avoided as a result, it preferably being possible for axial bearing of this type to be additionally provided. For example, the plug and/or that end of the connecting duct which points toward the connecting space are/is of conical configuration, with the result that inexpensive temporary sealing of the connecting duct can take place even in the case of low tolerance requirements.

The plug preferably has at least one sealing element, in particular sealing ring and/or sealing washer, for bearing radially and/or axially against the connecting duct in the closed position of the valve piston. Steel on steel contact can be avoided by way of the sealing element which is manufactured, in particular, from an elastomer material, with the result that a high sealing action is achieved with a low pressure force. More than one sealing element is preferably provided, it being possible for the one sealing element to seal in the radial direction and for another sealing element to seal in the axial direction between the connecting duct and the remaining plug.

The control space is particularly preferably sealed with respect to the connecting space via a sealing ring which is inserted into the valve piston. The sealing ring can configure an axially displaceable but fluid-tight sealing action of the control space with respect to the connecting space, with the result that the control space and connecting space which are configured in the valve housing and are configured by the displaceable valve piston are disconnected from one another.

The sealing ring can be sufficiently tight with respect to compressed air as pressure medium in the control space, in particular even at a pressure of 20 bar in the control space. To this end, the inner side of the valve housing can have a sufficiently high surface quality with a low roughness. Since the valve piston is moved only on very few occasions, however, it is in principle possible, however, to allow a lower surface quality for the inner side of the valve housing and to provide a correspondingly high contact pressure for the sealing ring, which contact pressure is still low enough, however, in order for it to be possible for the valve piston to be moved axially. Here, the finding is utilized that, on account of the low number of deposits of the valve piston, wear effects of the sealing ring as a result of abrasive friction on the inner side of the valve housing are negligible.

In particular, the valve piston has a control face which delimits the control space and a connecting face which is, in particular, annular and delimits the damper volume in the closed position of the valve piston, the control face being greater than the area of the damping duct. A deliberate hydraulic boost can be achieved by way of the faces of different size on those axial sides of the valve piston, on which the pressure in the control space can act on one side and the pressure in the damper space can act on the other side. A static pressure of approximately 8 bar prevails in the damper itself. The hydraulic connection can therefore be utilized here. During filling of the hydraulic lines during customer service, the hydraulic boost to the connecting space is advantageous. The annular connecting face can be configured, in particular, by way of the plug which projects in the axial direction, with the result that the hydraulic boost is canceled only in the open position when a pressure can also act on the axial end side of the plug in the connecting space. In the closed position, an internal pressure of the shock absorber can act only on the end side of the plug, with the result that the control pressure which acts on the considerably larger control face in the control space can easily keep the connecting duct closed.

A restoring spring which is configured, in particular, as a compression coil spring is preferably provided in the connecting space in order to move the valve piston into the open position, the restoring spring, in particular, being plugged onto the plug and/or being guided radially by the plug. When the control pressure is reduced, the restoring spring can automatically move the valve piston into the open position. It is possible here that a pressure in a connected hydraulic line which communicates with the connecting space assists the movement of the valve piston into the open position.

The connecting duct particularly preferably has a radially outwardly projecting flange hub for axially covering the connecting space. As a result, the flange hub can serve as a cover for the substantially tubular and/or pot-shaped valve housing. In particular, the valve housing can be screwed to the shock absorber or can be connected in another way, with the result that the flange hub of the connecting duct can be easily clamped in a sealing manner between the valve housing and the shock absorber.

In particular, the control duct is connected to a pressure relief valve and/or a check valve which can be opened. The control duct can be filled with a pressure medium, in particular compressed air, and can be held back in the control space by the valve which is connected to the control duct, even when a supply line for filling the pressure medium is disconnected again. If the valve is configured as a check valve which can be opened, the check valve can be opened manually after the connection of the hydraulic lines, with the result that the pressure medium can be discharged to the surroundings. The valve piston can then be moved into the open position by the pressure of the hydraulic fluid which is filled via the connected hydraulic lines and/or by the pressure of a restoring spring. If the valve is configured as a pressure relief valve, it is possible as a result to move the valve piston into the open position by the hydraulic fluid being pumped from the connected hydraulic line at a pressure which is so high that the threshold pressure of the pressure relief valve is exceeded and the pressure medium in the control space is pressed out automatically, without it being necessary for a valve to be actuated manually to this end.

A venting duct which communicates with the connecting space is preferably provided. The venting duct is connected to the surroundings, for example, via a valve which can be opened. Air inclusions can be discharged via the venting duct, with the result that an undesired compressible behavior of the fluid which is situated in the shock absorber can be avoided.

Furthermore, the invention relates to a shock absorber unit for an active suspension damping system of a motor vehicle, the shock absorber having a damper volume for providing a damping action with the aid of a hydraulic fluid which is filled into the damper volume and a valve block which communicates with a damper volume of the shock absorber and can be configured and developed as described above. The connecting duct can be closed and opened easily by way of the plug as a result of the valve piston which can be moved in a pressure-induced manner via the control duct, with the result that inexpensive and robust temporary shutting of the hydraulic fluid in a shock absorber of an active suspension damping system of a motor vehicle is made possible with only a low risk of faulty operation.

A further aspect of the invention relates to a method for mounting a shock absorber for an active suspension damping system of a motor vehicle, in the case of which method a shock absorber and a valve block which communicates with a damper volume of the shock absorber and can be configured and developed as described above are provided, a control pressure for moving the valve piston into the closed position is applied via the control duct in the control space, in particular pneumatically, in order to shut a hydraulic fluid in the damper volume of the shock absorber, at least one hydraulic line of the active suspension damping system is subsequently connected to the at least one connector duct, the control pressure in the control space is subsequently reduced, and further hydraulic fluid is loaded via the connector duct, the valve piston being moved into the open position. The connecting duct can be closed and opened easily by way of the plug as a result of the valve piston which can be moved in a pressure-induced manner via the control duct, with the result that inexpensive and robust temporary shutting of a hydraulic fluid in a shock absorber of an active suspension damping system of a motor vehicle is made possible with only a low risk of faulty operation. The method can be configured and developed, in particular, as described above using the valve block and/or the shock absorber unit.

BRIEF DESCRIPTION OF THE DRAWINGS

In the following text, the invention will be explained with reference to the appended drawings using preferred exemplary embodiments by way of example, it being possible for the features which are shown in the following text to present an aspect of the invention both in each case individually and in combination. In the drawings.

DETAILED DESCRIPTION OF THE INVENTION

Figure 1:
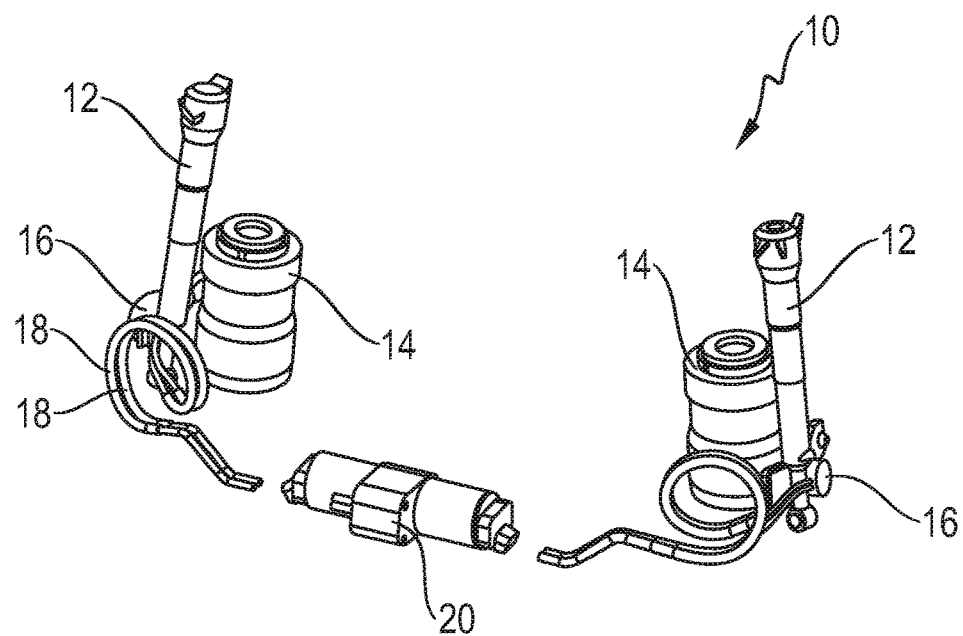
FIG. 1 shows a diagrammatic perspective view of a partially assembled suspension damping system.

The suspension damping system 10 (shown in FIG. 1) of a wheel suspension system is provided for an axle of a motor vehicle, and has in each case one shock absorber 12 and one air spring 14 for the left hand side and the right hand side, in order for it to be possible for in each case one wheel of the motor vehicle to be damped actively. The shock absorber 12 can be filled with a hydraulic fluid via a valve block 16. In order for it to be possible for the pressure of the hydraulic fluid to be changed in a damper volume of the shock absorber 12, a pump 20 is connected via hydraulic lines 18 which are assigned in each case to an inflow and a return flow.

Figure 2:
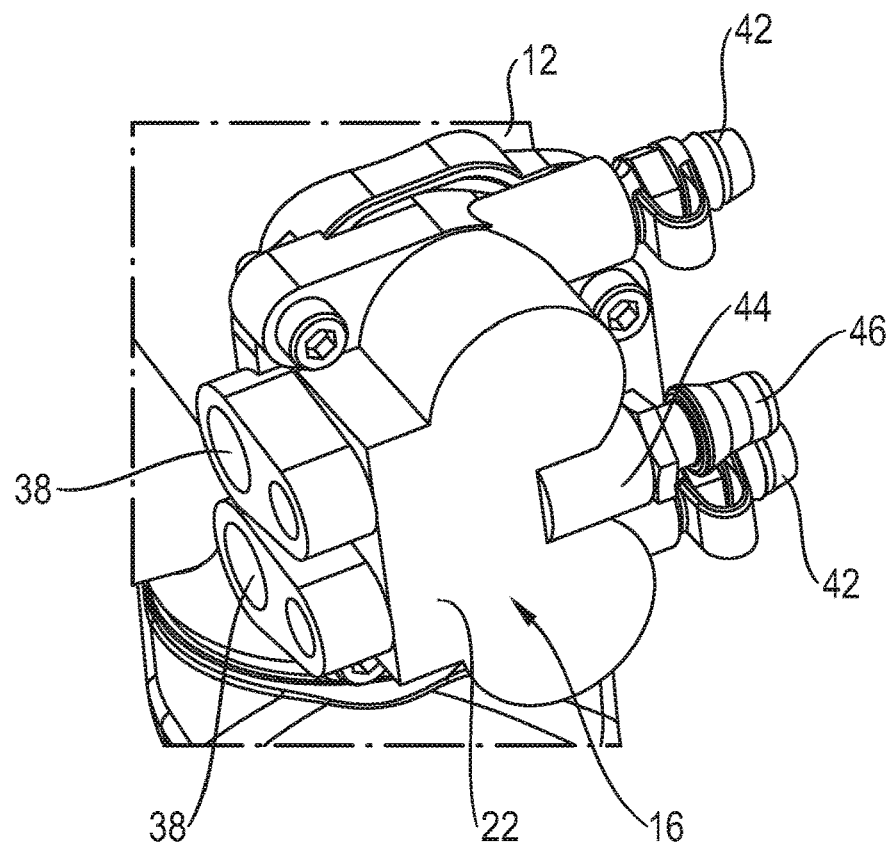
FIG. 2 shows a diagrammatic perspective view of a detail of the suspension damping system from FIG. 1.
Figure 3:
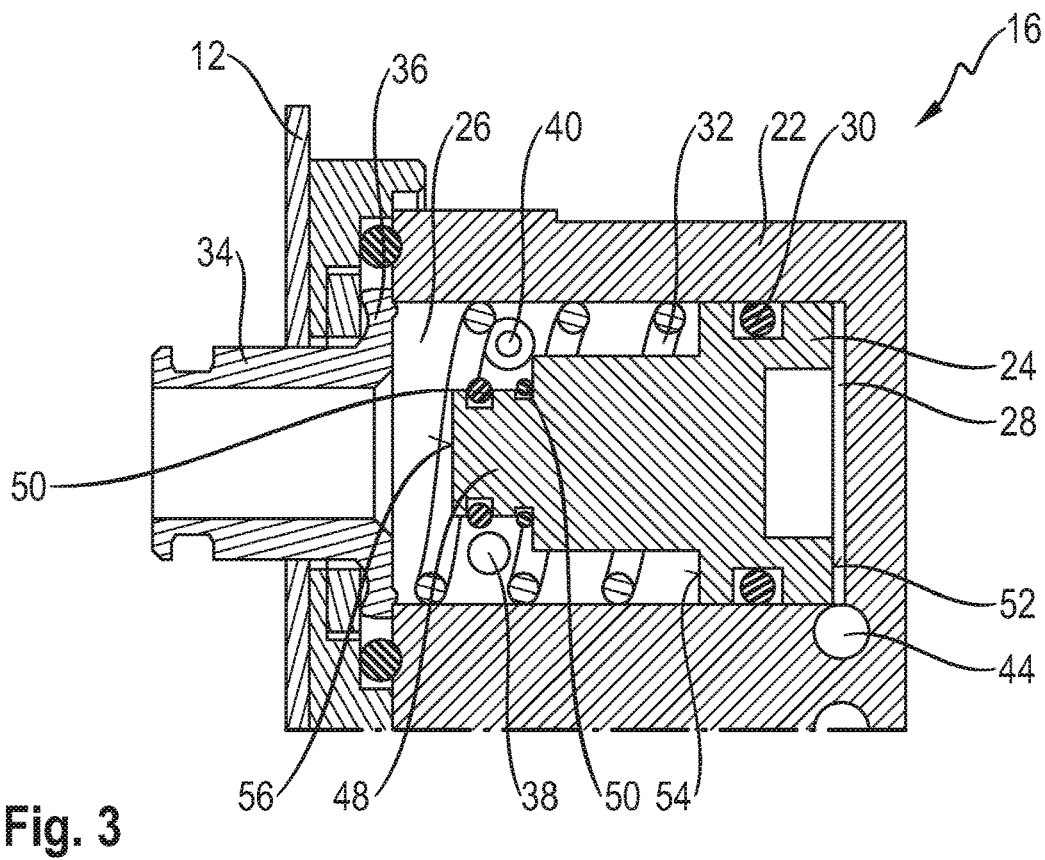
FIG. 3 shows a diagrammatic sectional view of a part of a valve block of the suspension damping system from FIG. 2 in the open position.
Figure 4:
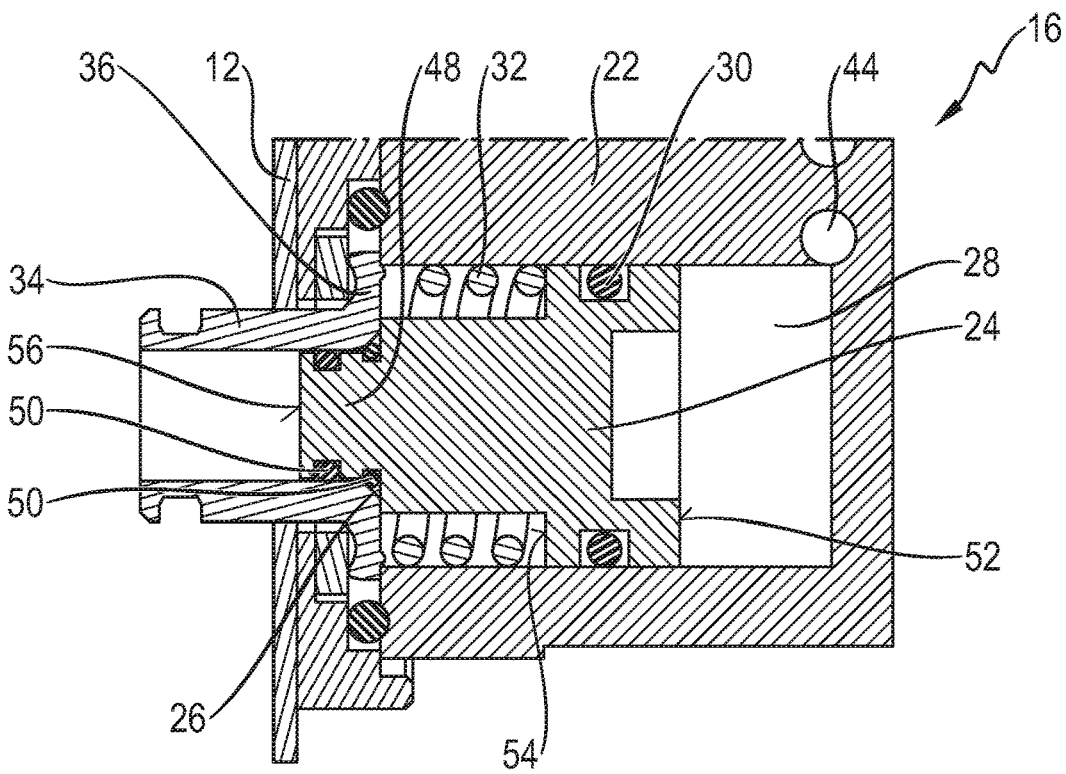
FIG. 4 shows a diagrammatic sectional view of a part of a valve block of the suspension damping system from FIG. 2 in the closed position.

As shown in FIG. 2, the valve block 16 can have a valve unit in each case for the inflow and the outflow in a common valve housing 22 which is screwed to the shock absorber 12, of which valve units in each case only one is shown in section in FIG. 3 and FIG. 4. As FIG. 3 and FIG. 4 show, an axially movable valve piston 24 is provided in the valve housing 22, which valve piston 24 divides an interior space of the valve housing 22 into a connecting space 26 and a control space 28. A sealing ring 30 is inserted into the valve piston 24, which sealing ring 30 acts in a sealing manner on an inner side of the valve housing 22, in order to seal the connecting space 26 and the control space 28 with respect to one another. The valve piston 24 can be moved automatically into the open position (shown in FIG. 3) with the aid of a spiral restoring spring 32 which is configured as a compression spring.

An axially running connecting duct 34 is provided on an axial side of the connecting space 26, which axial side points away from the control space 28, which connecting duct 34 can be connected to the damper volume of the shock absorber 12. The connecting duct 34 has a radially outwardly projecting flange hub 36 which can close off the connecting space 26 axially in the manner of a cover. A connector duct 38 communicates with the connecting space 26, to which connector duct 38 one of the hydraulic lines 18 can be connected, in order to fill the shock absorber 12 and/or to change its pressure in the open position of the valve block 16 via the connecting space 26. A venting duct 40 likewise communicates with the connecting space 26, via which venting duct 40 air inclusions can be discharged. The venting duct 40 can be closed by a valve 42.

A control duct 44 communicates with the control space 28, to which control duct 44 a compressed air line can be connected via a check valve 46 which can be opened. A control pressure can be applied in the control space 28, which control pressure is so high that the valve piston 24 can be moved counter to the spring force of the restoring spring 32 into the closed position (shown in FIG. 4). The valve piston 24 has a plug 48 which projects in the axial direction and, in the closed position of the valve block 16, is plugged into the connecting duct 34 in a sealing manner. In one alternative (not shown), the plug 48 can also have a cone. To this end, the plug 48 has sealing elements 50 which can be pressed radially and/or axially onto the connecting duct 34 in a sealing manner. In the closed position, the pressure in the control space 28 can act on a control face 52, whereas only an annular connecting face 54 is active in the connecting space 26 on account of the plug 48 which is plugged in. An internal pressure of the shock absorber 12 acts only on an end side 56 of the plug 48.

Even in the closed position of the valve block 16, the connector duct 38 communicates with the connecting space 26 and is not closed by the valve piston 24. This makes it possible, after a function test of the shock absorber 12, for hydraulic fluid to be pressed out of the connecting space 26 when the valve piston 24 is moved pneumatically into the closed position. At the same time, the hydraulic fluid in the damper volume of the shock absorber 12 can be enclosed with the aid of the plug 48. When the suspension damping system 10 is installed in a motor vehicle and the hydraulic lines 18 are connected, the pressure in the control space 28 can be reduced or overcome, in order to move the valve piston 24 into the open position, as a result of which the functionality of the shock absorber 12 is activated. For repair and/or maintenance purposes, the pressure in the control space 28 can be increased again with the aid of compressed air, in order to close the shock absorber 12 in a sealed manner and in order for it to be possible for components of the suspension damping system 10 to be dismantled.

What is claimed is:

1. A valve block for an active suspension damping system of a motor vehicle, said valve block comprising:
   a valve housing which delimits an interior space for connecting to a shock absorber of a wheel suspension system,
   a valve piston which is movably guided in the interior space, the valve piston dividing the interior space into a connecting space and a control space,
   a connecting duct which communicates with the connecting space for hydraulically connecting to a damper volume of the shock absorber,
   at least one connector duct which communicates with the connecting space for connection of a hydraulic line, wherein the connecting duct and the at least one connector duct are each openings that are formed on the valve housing,
   a control duct which communicates with the control space for applying a control pressure in the control space,
   a plug disposed on the valve piston for closing the connecting duct in a closed position of the valve piston in the interior space and for opening the connecting duct in an open position of the valve piston in the interior space, and
   a restoring spring which is configured as a compression coil spring and disposed in the connecting space in order to move the valve piston into the open position, the restoring spring being either plugged onto the plug, guided radially by the plug, or both plugged onto the plug and guided radially by the plug.

2. The valve block as claimed in claim 1, wherein the plug is plugged at least partially into the connecting duct in the closed position of the valve piston.

3. The valve block as claimed in claim 1, wherein the plug has at least one sealing element for bearing either radially, axially or both radially and axially against the connecting duct in the closed position of the valve piston.

4. The valve block as claimed in claim 3, wherein the sealing element is either a sealing ring, a sealing washer, or both a sealing ring and a sealing washer.

5. The valve block as claimed in claim 1, wherein the control space is sealed with respect to the connecting space via a sealing ring which is inserted into the valve piston.

6. The valve block as claimed in claim 1, wherein the valve piston has a control face which delimits the control space and a connecting face which is annular and delimits the connecting duct in the closed position of the valve piston, the control face being larger than the connecting face.

7. The valve block as claimed in claim 1, wherein the connecting duct includes a radially outwardly projecting flange hub for axially covering the connecting space.

8. The valve block as claimed in claim 1, wherein the control duct is connected to a pressure relief valve which can be opened, a check valve which can be opened, or both the pressure relief valve and the check valve.

9. The valve block as claimed in claim 1, further comprising a venting duct which communicates with the connecting space.

10. The valve block as claimed in claim 1, wherein the moveable valve piston is a unitary component and the plug is integrated with the valve piston.

11. The valve block as claimed in claim 1, wherein the plug is a reduced diameter portion of the valve piston that is sized to be inserted into the connecting duct.

12. The valve block as claimed in claim 1, wherein no fluid channels are defined in the valve piston.

13. The valve block as claimed in claim 1, wherein in the open position of the valve piston, an entirety of the valve piston is positioned outside of the connecting duct.

14. In a valve block for an active suspension damping system including (i) a valve housing which delimits an interior space for connecting to a shock absorber of a wheel suspension system, (ii) a valve piston which is movably guided in the interior space, the valve piston dividing the interior space into a connecting space and a control space, (iii) a connecting duct which communicates with the connecting space for hydraulically connecting to a damper volume of the shock absorber, the connecting duct being an opening that is formed on the valve housing, (iv) at least one connector duct which communicates with the connecting space for connection of a hydraulic line, the at least one connector duct being an opening that is formed on the valve housing, (v) a plug disposed on the valve piston for closing the connecting duct in a closed position of the valve piston in the interior space and for opening the connecting duct in an open position of the valve piston in the interior space, (vi) a control duct which communicates with the control space for applying a control pressure in the control space, and (vii) a restoring spring which is configured as a compression coil spring and disposed in the connecting space in order to move the valve piston into the open position, the restoring spring being either plugged onto the plug, guided radially by the plug, or both plugged onto the plug and guided radially by the plug, a method for mounting the shock absorber comprising:
   applying a control pressure, either pneumatically or hydraulically, for moving the valve piston against a bias of the restoring spring into the closed position via the control duct in the control space, in order to trap hydraulic fluid in the damper volume of the shock absorber,
   subsequently connecting the hydraulic line of the active suspension damping system to the at least one connector duct, subsequently reducing the control pressure in the control space,
loading further hydraulic fluid via the connector duct, and
moving the valve piston into the open position under the bias of the restoring spring.

15. The method of claim 14, wherein the moveable valve piston is a unitary component and the plug is integrated with the valve piston.

16. The method of claim 14, wherein the plug is a reduced diameter portion of the valve piston that is sized to be inserted into the connecting duct.

17. The method of claim 14, wherein no fluid channels are defined in the valve piston.

18. The method of claim 14, wherein in the open position of the valve piston, an entirety of the valve piston is positioned outside of the connecting duct.

* * * * *